US012774070B2

(12) United States Patent
Oikawa

(10) Patent No.: US 12,774,070 B2
(45) Date of Patent: Oct. 27, 2026

(54) VAPOR SEPARATOR, METHOD FOR PRODUCING VAPOR SEPARATOR, AND OUTBOARD MOTOR

(71) Applicant: MIKUNI CORPORATION, Tokyo (JP)

(72) Inventor: Takumi Oikawa, Odawara (JP)

(73) Assignee: MIKUNI CORPORATION, Tokyo (JP)

( * ) Notice: Subject to any disclaimer, the term of this patent is extended or adjusted under 35 U.S.C. 154(b) by 0 days.

(21) Appl. No.: 19/057,297

(22) Filed: Feb. 19, 2025

(65) Prior Publication Data

US 2025/0282463 A1 Sep. 11, 2025

(30) Foreign Application Priority Data

Mar. 11, 2024 (JP) ................................ 2024-036551

(51) Int. Cl.
*F02M 37/20* (2006.01)
*B63H 20/00* (2006.01)

(52) U.S. Cl.
CPC ........... *B63H 20/001* (2013.01); *F02M 37/20* (2013.01)

(58) Field of Classification Search
CPC .............................. F02M 37/20; B62H 20/001
See application file for complete search history.

(56) References Cited

U.S. PATENT DOCUMENTS 5,445,503 A * 8/1995 Kmiec .................. F04D 29/606 417/363
6,675,778 B1 * 1/2004 Kemper ............... F02M 37/106 137/565.24
8,939,736 B2 * 1/2015 Israelson ............... F01C 19/005 417/310
2005/0155583 A1 * 7/2005 Mitsudou ............... F02M 37/44 123/509
2007/0098573 A1 * 5/2007 Ueno .................. F02M 37/103 417/360
2009/0071448 A1 * 3/2009 Smith .................... F02M 37/20 123/518
2009/0193873 A1 * 8/2009 Nakamura ......... F02M 37/0082 73/31.05
2016/0288028 A1 * 10/2016 Moreno ................. B01D 35/26
2021/0164427 A1 * 6/2021 Billot ................... F02M 37/103

FOREIGN PATENT DOCUMENTS

JP 2011073630 A 4/2011

* cited by examiner

*Primary Examiner* — Long T Tran
(74) *Attorney, Agent, or Firm* — ROSSI, KIMMS & McDOWELL LLP

(57) ABSTRACT

The invention provides a vapor separator easily assembled with a fuel pump while suppressing cost increases due to increase in number of parts, and a method for producing the vapor separator. A vapor separator installed in a fuel supply system is provided with: a tank for storing liquid fuel; and a fuel pump disposed in the tank. The tank includes: upper member assembled with an upper portion of the fuel pump; and lower member located below the upper member, connected to upper member, and having a holding part for holding a lower portion of the fuel pump. Lower member of tank includes a guide part located between side wall of lower member and the holding part in plan view, the guide part serving to guide lower portion of the fuel pump toward the holding part when upper member with upper portion of fuel pump attached is assembled to lower member.

12 Claims, 11 Drawing Sheets

1

VAPOR SEPARATOR, METHOD FOR PRODUCING VAPOR SEPARATOR, AND OUTBOARD MOTOR

TECHNICAL FIELD

The present disclosure relates to a vapor separator installed in a fuel supply system of an engine, a method for producing the same, and an outboard motor equipped with the vapor separator.

BACKGROUND

A vapor separator installed in a fuel supply system for an engine of an outboard motor to supply fuel to the engine is conventionally known. In general, a vapor separator includes a tank for storing liquid fuel and a fuel pump installed in the tank.

For example, Patent Document 1 describes a vapor separator in which a case (tank) for storing liquid fuel is composed of an upper case (upper member) and a lower case (lower member), and a high-pressure fuel pump (fuel pump) is housed in the case (tank). In the vapor separator described in Patent Document 1, the upper part of the high-pressure fuel pump (fuel pump) is supported by the upper case (upper member) of the case (tank) via rubber bushing, while the lower part of the high-pressure fuel pump (fuel pump) is supported by the lower case (lower member) via cushion rubber.

CITATION LIST

Patent Literature

Patent Document 1: JP2011-73630A

SUMMARY

When assembling the vapor separator described in Patent Document 1, for example, the upper member (upper case) of the tank and the fuel pump (high-pressure fuel pump) could be assembled to the lower member (lower case) of the tank while the fuel pump is attached to the upper member.

However, since the fuel pump is itself a heavy object, the fuel pump can pivot on the bushing as a fulcrum while suspended from the upper case (upper member). Therefore, when assembling the upper member of the tank and the fuel pump to the lower member of the tank, the position of the fuel pump is not stable, making it difficult to assemble smoothly.

To stabilize the position of the fuel pump during assembly, a bracket (pump fixing part) could be provided in addition to the bushing to immovably secure the fuel pump to the upper member of the tank, but this would increase the cost due to the increased number of parts. In view of the above circumstances, an object of at least some embodiments of the present invention is to provide a vapor separator that can be easily assembled with a fuel pump while suppressing cost increases due to an increase in the number of parts, a method for producing a vapor separator, and an outboard motor.

A vapor separator according to at least some embodiments of the invention is a vapor separator installed in a fuel supply system for supplying fuel to an engine, with a tank for storing liquid fuel and a fuel pump disposed in the tank. The tank includes: an upper member assembled with an upper portion of the fuel pump; and a lower member located below the upper member, connected to the upper member, and having a holding part for holding a lower portion of the fuel pump. The lower member of the tank includes a guide part located between a side wall of the lower member and the holding part in plan view, the guide part serving to guide the lower portion of the fuel pump toward the holding part when the upper member with the upper portion of the fuel pump attached is assembled to the lower member.

According to at least some embodiments of the present invention, since the guide part is provided to guide the lower portion of the fuel pump toward the holding part when the upper member with the upper portion of the fuel pump attached is assembled to the lower member, the fuel pump can be easily installed.

Additionally, since the bracket (pump fixing part) to immovably secure the fuel pump to the upper member of the tank is not required, it is possible to suppress cost increases due to an increase in the number of parts.

DETAILED DESCRIPTION

Embodiments of the present invention will now be described in detail with reference to the accompanying drawings. It is intended, however, that unless particularly identified, dimensions, materials, shapes, relative positions, and the like of components described in the embodiments shall be interpreted as illustrative only and not intended to limit the scope of the present invention.

Figure 1:
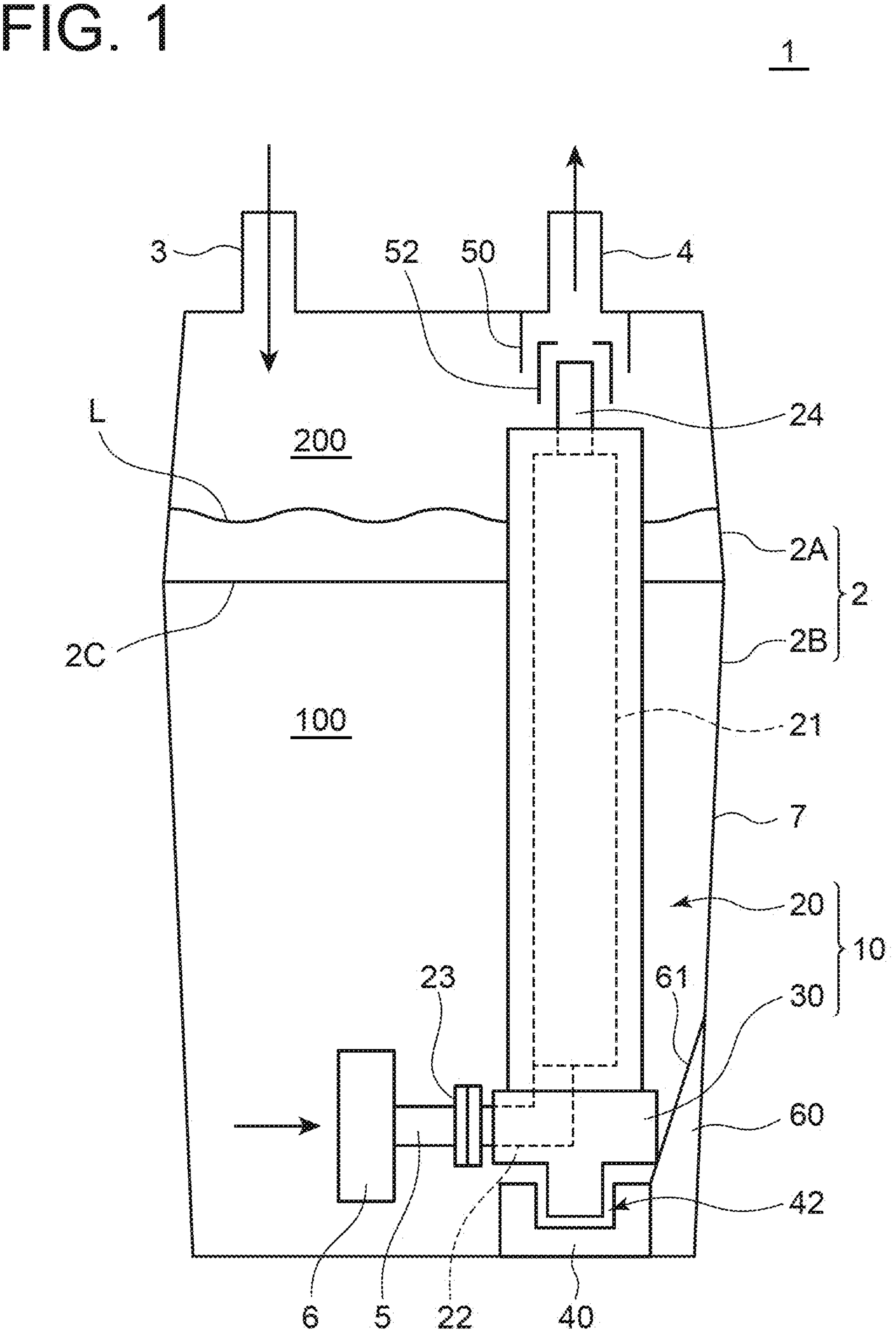
FIG. 1 is a schematic view of a vapor separator according to an embodiment.
Figure 2:
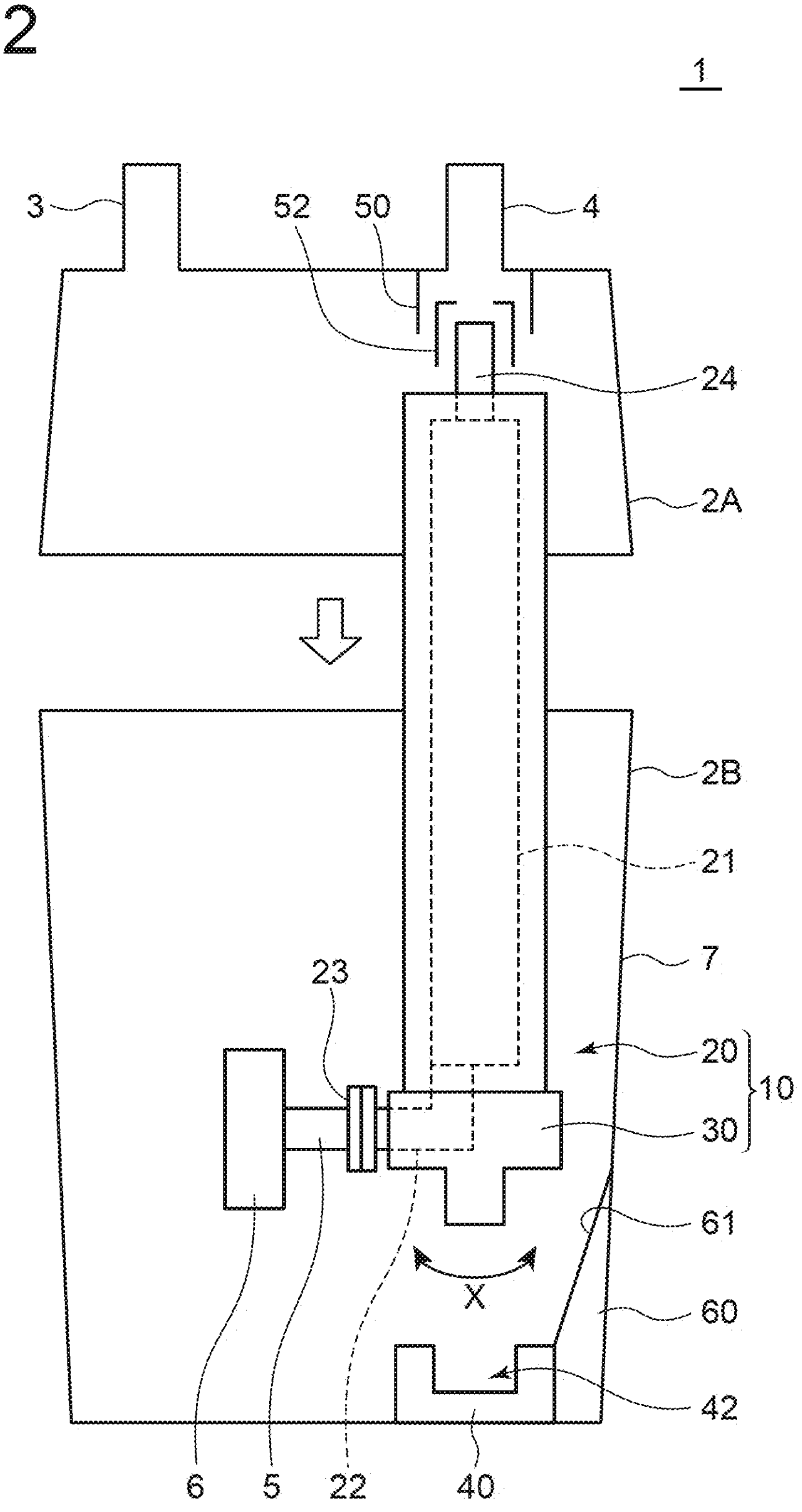
FIG. 2 is a schematic view showing the assembly of the vapor separator shown in FIG. 1.

FIG. 1 is a schematic view of a vapor separator according to an embodiment. FIG. 2 is a schematic view showing the assembly of the vapor separator shown in FIG. 1.

As shown in FIG. 1, in some embodiments, a vapor separator 1 includes a tank 2 for storing liquid fuel, and a fuel pump 10 disposed in the tank 2.

The vapor separator 1 is installed in a fuel supply system for an engine used in an outboard motor, for example, and is used in the middle of a fuel supply pipe for supplying fuel from a fuel tank to the engine.

In the example shown in FIG. 1, the vapor separator 1 is an open vapor separator with a vent passage (not shown) that releases fuel vapor in the tank 2 to the atmosphere to prevent the internal pressure in the tank 2 from rising.

In other embodiments, the vapor separator 1 is a closed vapor separator without a vent passage that communicates with the interior space of the tank 2. In a closed vapor separator, not only liquid fuel but also fuel vapor is led to the inlet of the fuel pump, where the fuel vapor is liquefied by the fuel pump and sent with the liquid fuel to the engine.

The tank 2 includes a fuel inlet 3 through which fuel flows in and a fuel outlet 4 through which fuel boosted by the fuel pump 10 flows out. The tank 2 defines the interior space where liquid fuel is stored and where the fuel pump 10 is housed. The interior space of the tank 2 includes a liquid phase section 100 where liquid fuel resides and a vapor phase section 200 where fuel vapor produced by vaporization of the liquid fuel resides. The interface between the liquid phase section 100 and the vapor phase section 200 is the liquid surface L in the tank 2. When the vapor separator 1 is in use, the fuel pump 10 is at least partially below the liquid surface L in the tank 2 and immersed in the liquid fuel (liquid phase section 100).

The tank 2 includes an upper member 2A and a lower member 2B that is located below the upper member 2A and fastened to the upper member 2A. The upper member 2A is a lid member that closes the upper opening of the bottomed lower member 2B. In the embodiment shown in FIG. 1, both the fuel inlet 3 and the fuel outlet 4 are provided in the upper member 2A. In other embodiments, at least one of the fuel inlet 3 or the fuel outlet 4 may be provided in the lower member 2B. The joint surface 2C between the upper member 2A and the lower member 2B is provided with a sealing member (not shown) to prevent fuel leakage from inside the tank 2 through the joint surface 2C.

The upper member 2A and the lower member 2B of the tank 2 have an annular protruding portion 50 and a holding part 40, which will be described below, respectively, as supports for the fuel pump 10.

The fuel pump 10 housed in the tank 2 with the above configuration includes a pump body 20 and an elastic cover 30 covering a lower portion of the pump body 20.

The elastic cover 30 may be formed of any material having elasticity, for example, a polymeric material (elastomer) having elasticity.

The pump body 20 includes a pumping element 21 for boosting fuel pressure, a suction part 22 for directing fuel to the pumping element 21, and a discharge part 24 for discharging the fuel boosted by the pumping element 21.

The pumping element 21 of the pump body 20 can be a positive displacement pump such as a diaphragm pump or vane pump, or a non-positive displacement pump such as a volute pump, axial flow pump, or mixed flow pump.

The suction part 22 may be a suction tube that communicates with the pumping element 21 in the pump body 20. In the exemplary embodiment shown in FIG. 1, the suction part 22 is a suction tube composed of an elbow that includes an upstream tube section along the horizontal direction and a downstream tube section along the vertical direction, and the upstream end 23 of the upstream tube section of the suction part (suction tube) 22 is connected to an outlet tube 5 of a filter element 6, which will be described below.

The discharge part 24 may be a discharge tube that communicates with the pumping element 21 in the pump body 20.

In the embodiment shown in FIG. 1, the pump body 20 has the suction part 22 at a lower portion of the pump body 20 and the discharge part 24 at an upper portion of the pump body 20. In this case, the suction part 22 is at least partially covered by the elastic cover 30 described below.

In other embodiments, the suction part 22 of the pump body 20 is provided at an upper portion of the pump body 20 and sucks liquid fuel from the liquid phase section 100 through an extension tube. On the other hand, the discharge part 24 of the pump body 20 is provided at a lower portion of the pump body 20 and discharges the fuel to the fuel outlet 4 through an extension tube. In this case, the discharge part 24 is at least partially covered by the elastic cover 30 described below.

In some embodiments, an upper portion of the fuel pump 10 is assembled to the upper member 2A of the tank 2, while a lower portion (elastic cover 30) of the fuel pump 10 is held by the holding part 40 of the lower member 2B of the tank 2.

In the embodiment shown in FIG. 1, the upper member 2A has an annular protruding portion 50 for assembling the upper portion (discharge part 24) of the fuel pump 10. The upper portion (discharge part 24) of the fuel pump 10 is assembled to the annular protruding portion 50 of the upper member 2A via an elastic bushing 52. The elastic bushing 52 is disposed between the upper portion (discharge part 24) of the fuel pump 10 and the upper member 2A (annular protruding portion 50). The elastic bushing 52 may function as a sealing member to seal the gap between the discharge part 24 of the fuel pump 10 and the upper member 2A. The elastic bushing 52 may be formed of any material having elasticity, for example, a polymeric material (elastomer) having elasticity.

The holding part 40 of the lower member 2B includes a mating portion 42 capable of mating with the lower portion (elastic cover 30) of the fuel pump 10. The holding part 40 functions to position the lower portion of the fuel pump 10 with respect to the lower member 2B. In the exemplary embodiment shown in FIG. 1, the mating portion 42 of the holding part 40 is a recess that engages with a protrusion of the lower portion of the fuel pump 10. In other embodiments, the mating portion 42 of the holding part 40 is a protrusion that engages with a recess of the lower portion of the fuel pump 10.

When assembling the vapor separator 1 with the above configuration, as shown in FIG. 2, the upper member 2A and the fuel pump 10 could be assembled to the lower member 2B of the tank 2 while the fuel pump 10 is attached to the upper member 2A of the tank 2.

However, since the fuel pump 10 is itself a heavy object, the fuel pump 10 can pivot on the elastic bushing 52 as a fulcrum while suspended from the upper member 2A (see the arrow X in FIG. 2). Therefore, it is necessary to stabilize the position of the fuel pump 10 when assembling the upper member 2A of the tank 2 and the fuel pump 10 to the lower member 2B of the tank 2.

Therefore, in some embodiments, as shown in FIGS. 1 and 2, the lower member 2B of the tank 2 includes a guide part 60 to guide the lower portion of the fuel pump 10 toward the holding part 40 when the upper member 2A with the upper portion of the fuel pump 10 attached is assembled to the lower member 2B.

The guide part 60 disposed at the lower member 2B stabilizes the position of the fuel pump 10, which tends to pivot on the elastic bushing 52 as a fulcrum while suspended from the upper member 2A, thus facilitating the assembly of the lower portion of the fuel pump 10 to the holding part 40.

In some embodiments, the guide part 60 is located between a side wall 7 of the lower member 2B and the holding part 40 when viewed from vertically above (i.e., in plan view).

In the embodiment shown in FIGS. 1 and 2, a portion of the guide part 60 is located between the side wall 7 of the lower member 2B and the holding part 40 and higher than the holding part 40. Specifically, the guide part 60 has a guide surface 61 that approaches the holding part 40 as it extends downward, and the portion of the guide part 60 including the guide surface 61 is located between the side wall 7 of the lower member 2B and the holding part 40 and higher than the holding part 40.

The specific configuration of the guide part 60 is not limited, as long as the guide part 60 can guide the lower portion of the fuel pump 10 toward the holding part 40 of the lower member 2B of the tank 2 when the fuel pump 10 suspended from the upper member 2A is lowered toward the holding part 40 of the lower member 2B.

In an embodiment, the guide part 60 includes a vertical rib extending along the vertical direction. The direction of extension of the vertical rib may be parallel to the vertical direction, or the angle formed by the direction of extension of the vertical rib with respect to the vertical direction may be greater than 0 degrees and not greater than 30 degrees. In other embodiments, the guide part 60 is a conical guide that extends upward from the holding part 40.

Referring to FIGS. 3 to 8, the specific configuration of a vapor separator 1A, in which the guide part 60 includes vertical ribs 60A, will be described, and referring to FIGS. 9 and 10, the specific configuration of a vapor separator 1B, in which the guide part 60 is a conical guide 60B, will be described.

Figure 3:
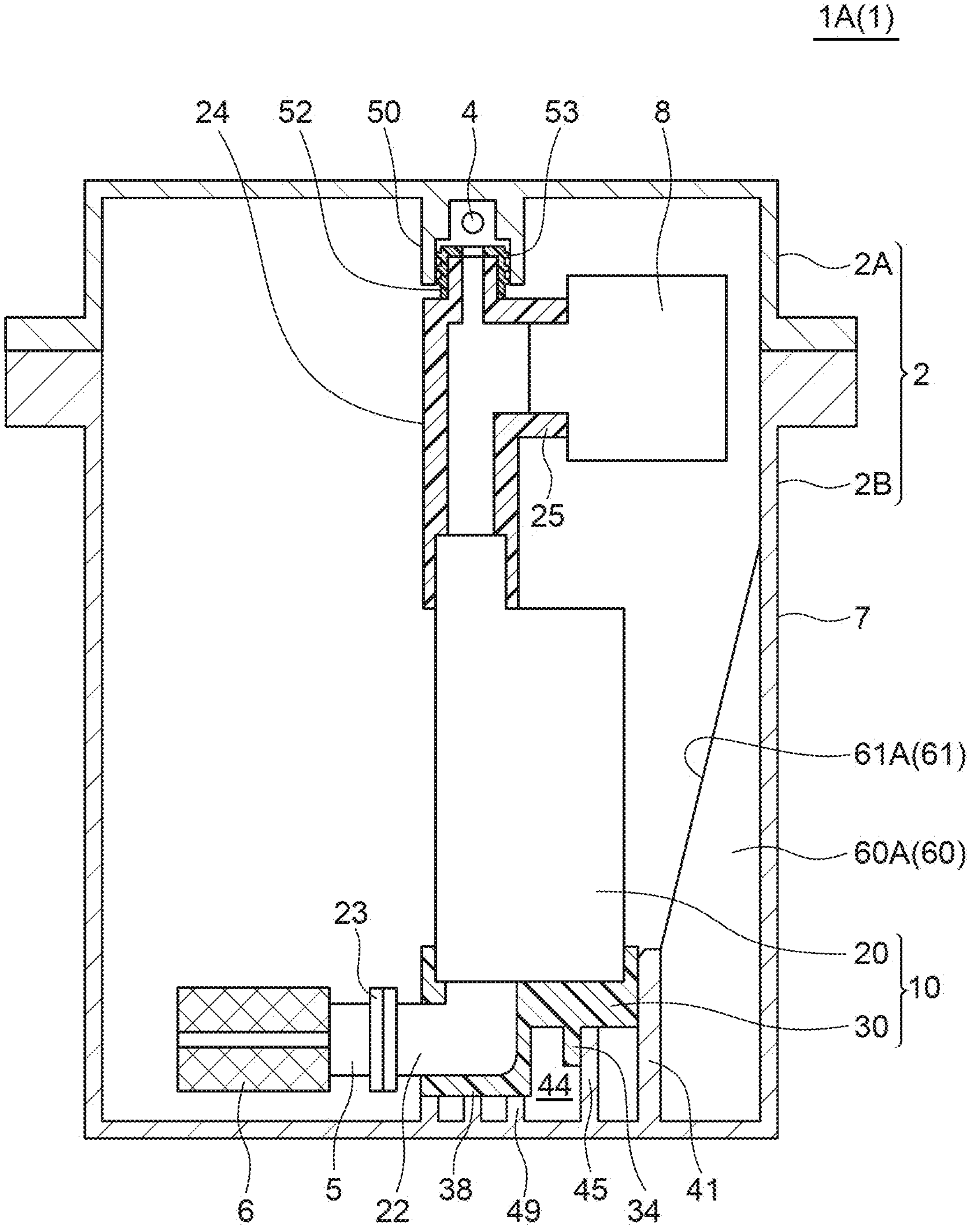
FIG. 3 is a cross-sectional view of the vapor separator according to an embodiment.
Figure 4:
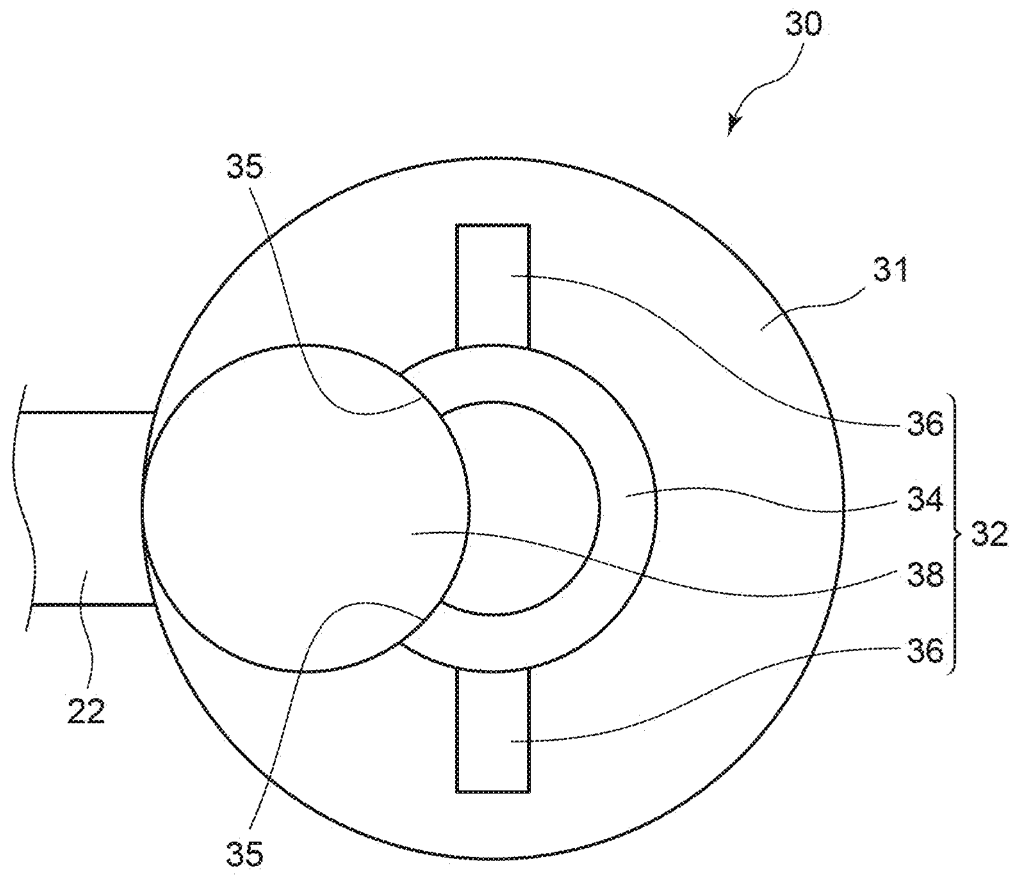
FIG. 4 is a bottom view of a lower portion of the fuel pump of the vapor separator according to an embodiment.
Figure 5:
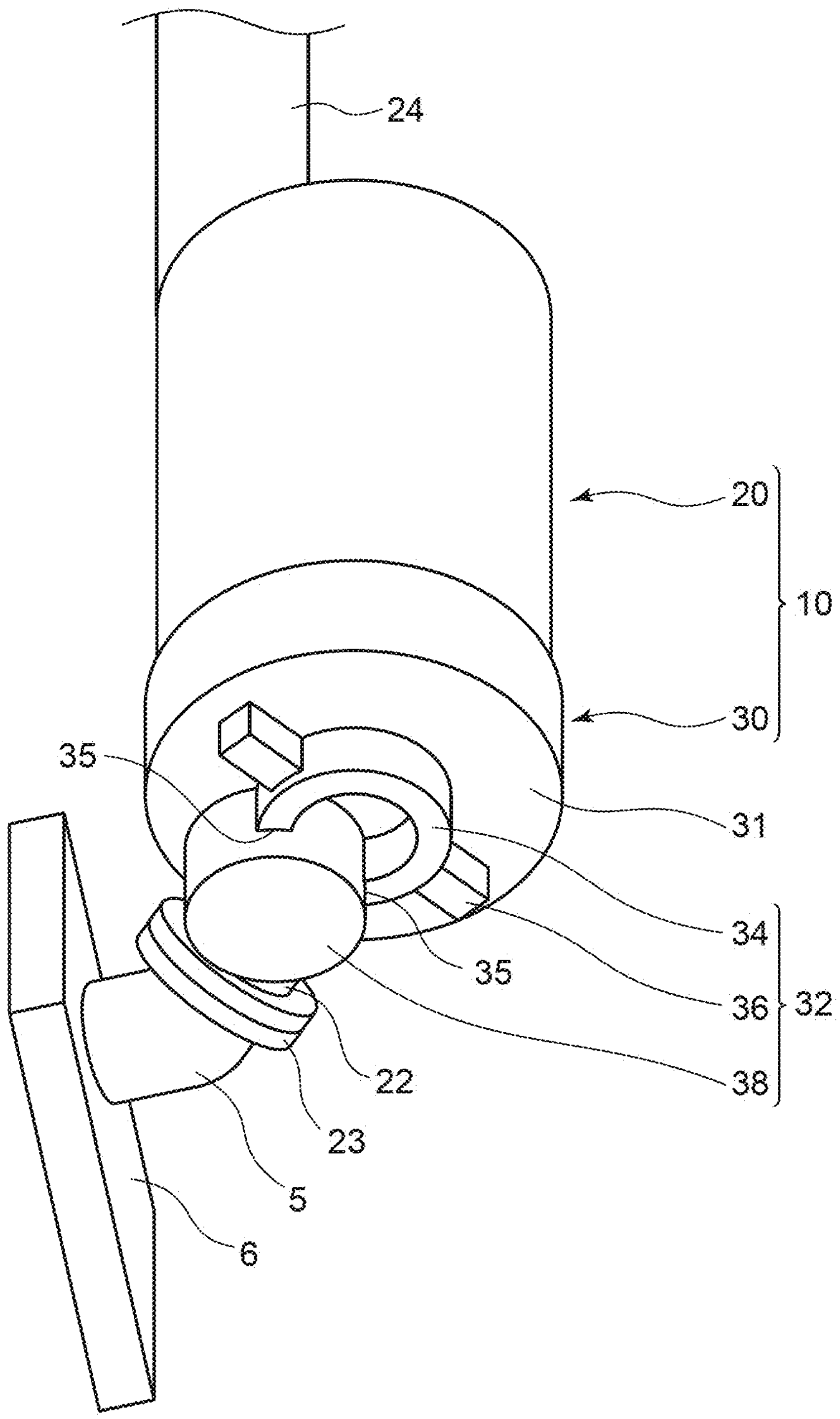
FIG. 5 is a perspective view of the fuel pump of the vapor separator and a filter element according to an embodiment.
Figure 6:
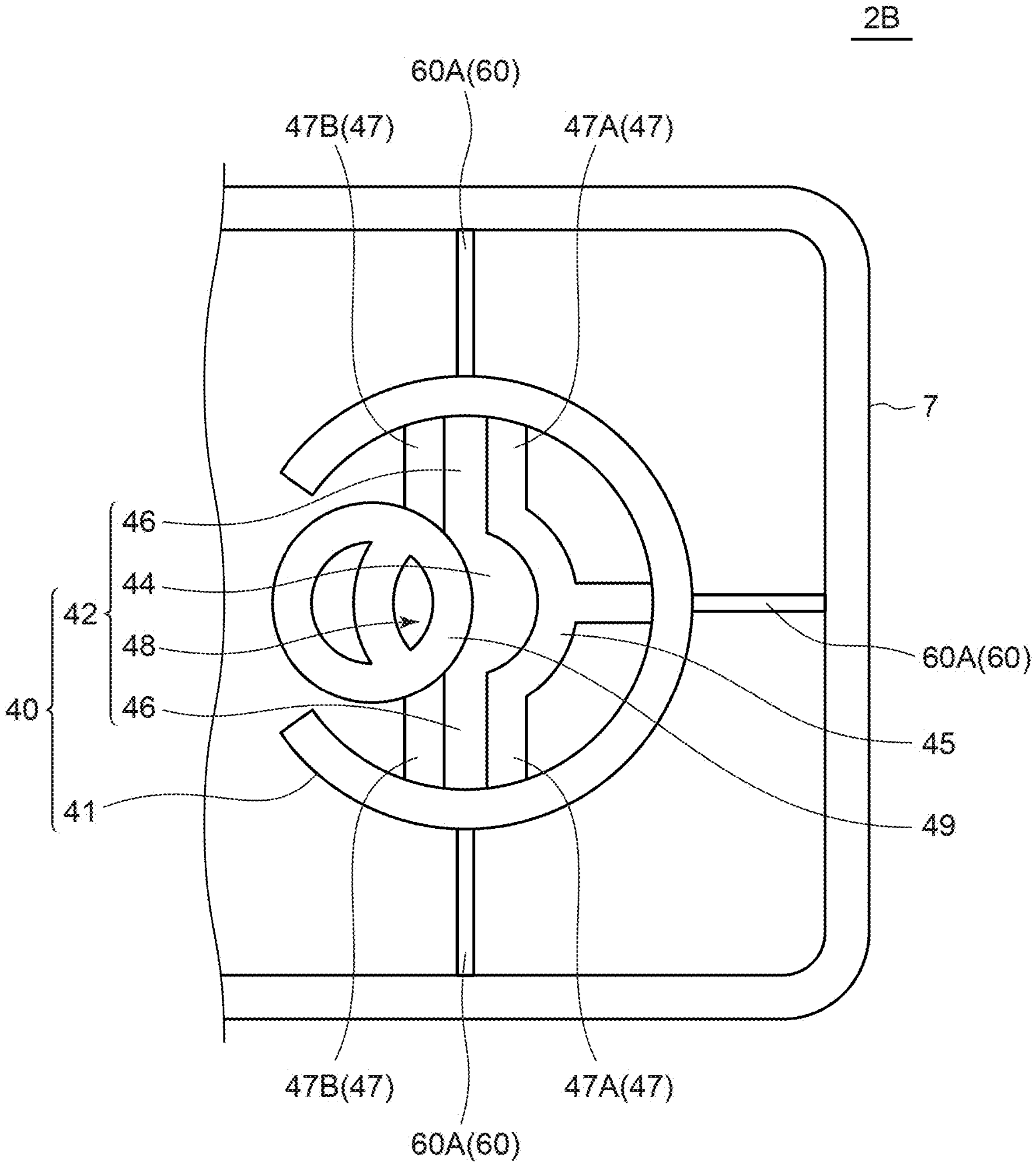
FIG. 6 is a plan view of the lower member of the tank of the vapor separator according to an embodiment.
Figure 7:
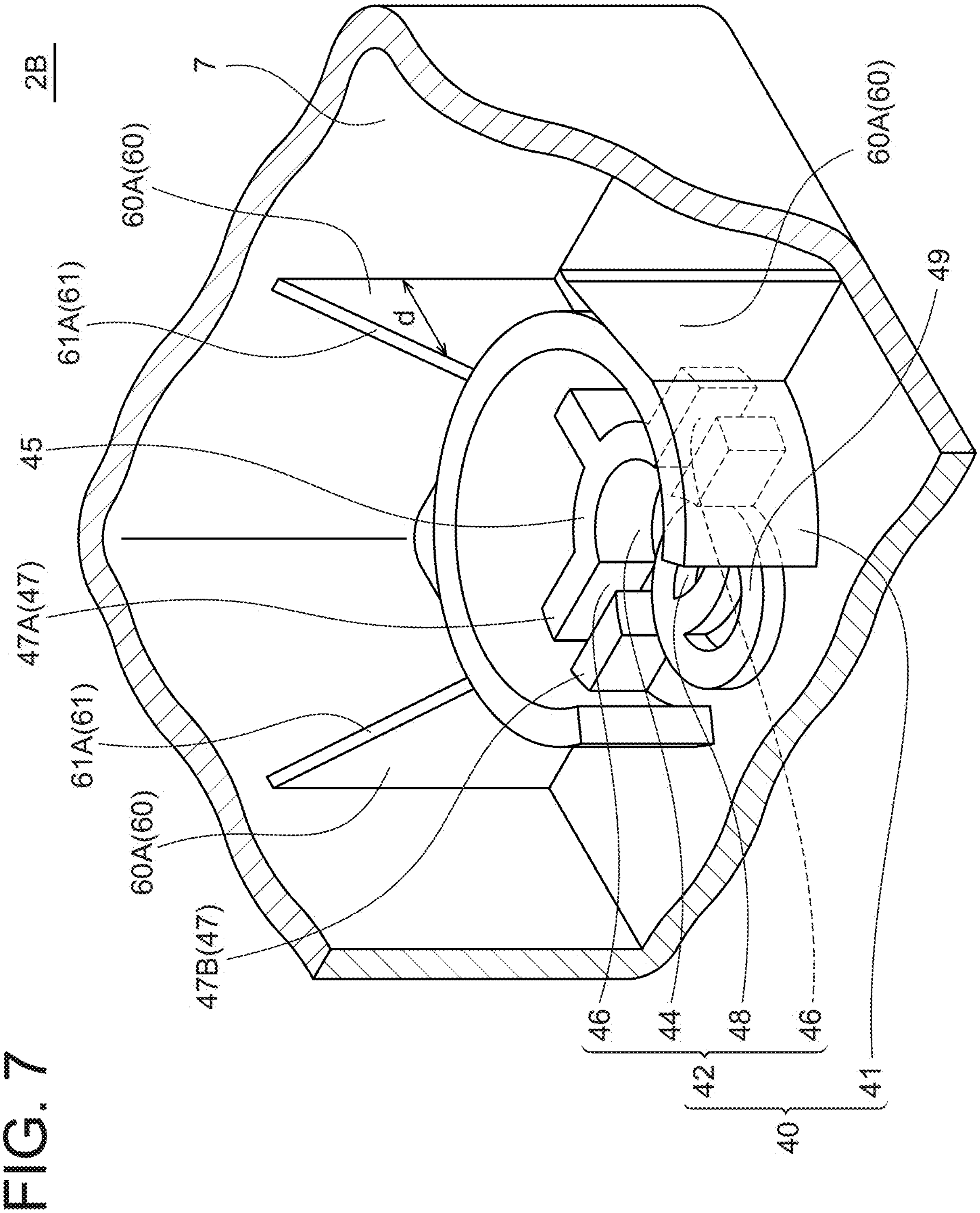
FIG. 7 is a partial cross-sectional perspective view of the lower member of the tank of the vapor separator according to an embodiment.
Figure 8:
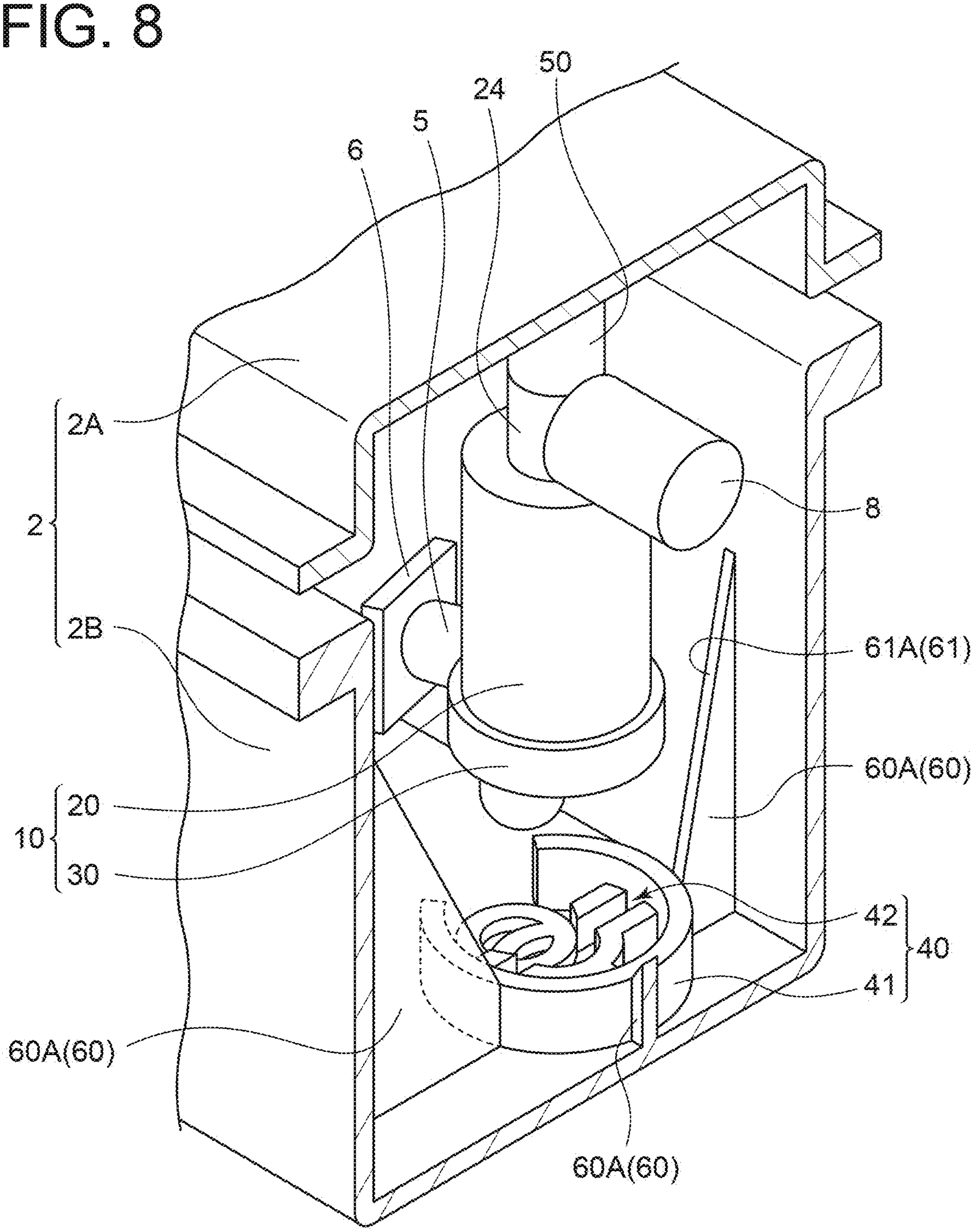
FIG. 8 is a partial cross-sectional perspective view showing the assembly of the vapor separator according to an embodiment.

FIG. 3 is a cross-sectional view of the vapor separator according to an embodiment. FIG. 4 is a bottom view of the lower portion of the fuel pump of the vapor separator according to an embodiment. FIG. 5 is a perspective view of the fuel pump of the vapor separator and a filter element according to an embodiment. FIG. 6 is a plan view of the lower member of the tank of the vapor separator according to an embodiment. FIG. 7 is a partial cross-sectional perspective view of the lower member of the tank of the vapor separator according to an embodiment. FIG. 8 is a partial cross-sectional perspective view showing the assembly of the vapor separator according to an embodiment.

Figure 9:
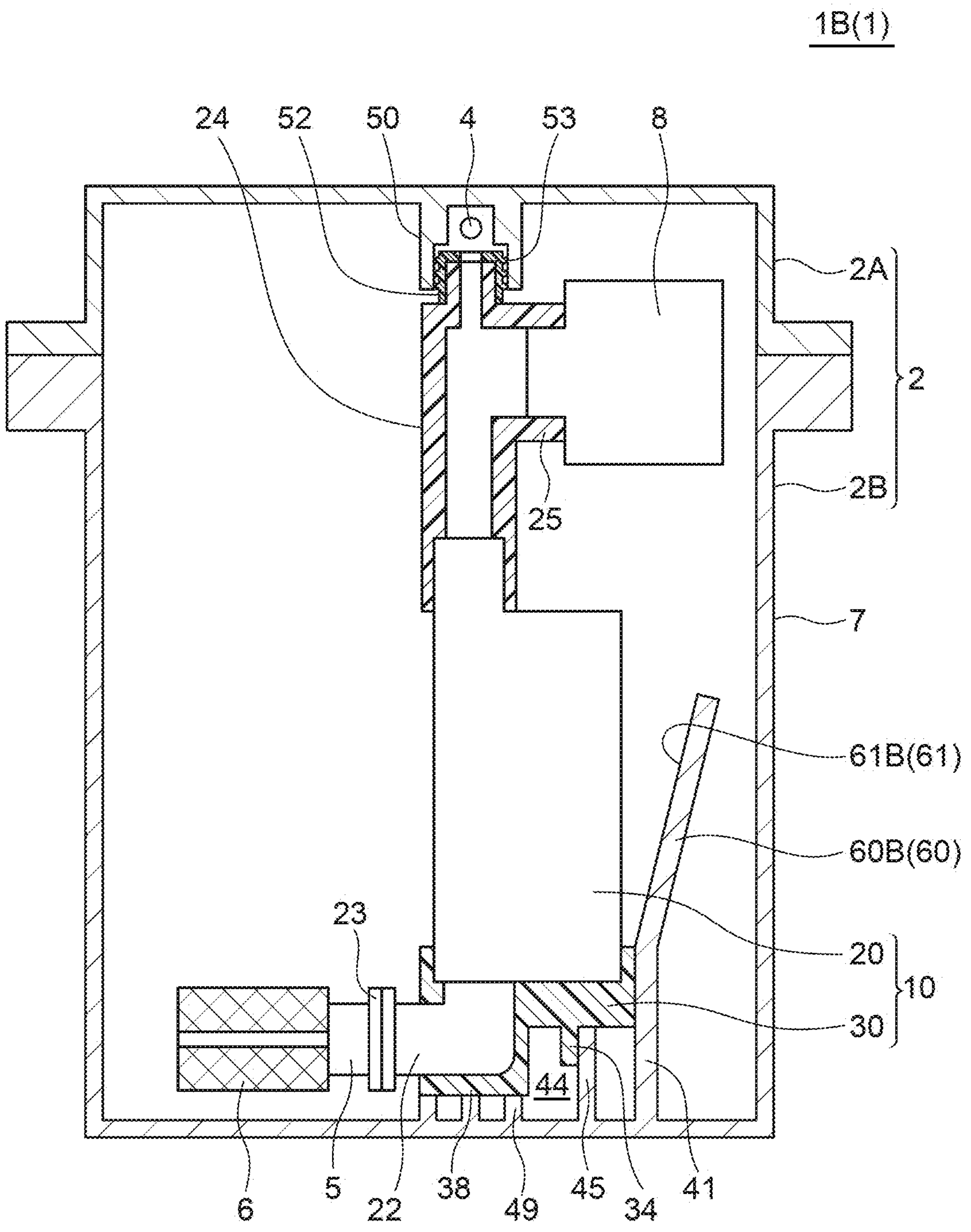
FIG. 9 is a cross-sectional view of the vapor separator according to another embodiment.

FIG. 9 is a cross-sectional view of the vapor separator according to another embodiment. FIG. 10 is a partial cross-sectional perspective view of the lower member of the tank of the vapor separator according to another embodiment.

Of the elements shown in FIGS. 3 to 10, those that are the same as the elements described above in reference to FIGS. 1 and 2 are denoted by the same reference characters, and repetitive description thereof will be omitted.

In some embodiments, as shown in FIGS. 3 and 9, the vapor separator 1 (1A, 1B) includes an elastic cover 30 covering a lower portion of the pump body 20 of the fuel pump 10, and the holding part 40 has a mating portion 42 capable of mating with the elastic cover 30.

In the exemplary embodiments shown in FIGS. 3 and 9, the discharge part 24 of the fuel pump 10 is composed of a discharge tube for directing fuel boosted by the fuel pump 10 to the fuel outlet 4. The discharge part 24 of the fuel pump 10 is assembled to the inner peripheral side of the annular protruding portion 50 of the upper member 2A of the tank 2 via an elastic bushing 52 having a plurality of annular protruding portions 53 on its outer circumference. A pressure regulator 8 is connected to a branch tube portion 25 of the discharge part 24 of the fuel pump 10 to regulate the pressure of fuel toward the fuel outlet 4 and to return excess fuel into the tank 2.

The vapor separator 1A shown in FIG. 3 differs from the vapor separator 1B shown in FIG. 9 in that the guide part 60 is vertical ribs 60A or a conical guide 60B. However, the vapor separator 1A and the vapor separator 1B share the same configuration of the lower portion (elastic cover 30) of the fuel pump 10 and the holding part 40 of the lower member 2B of the tank 2 as described below.

In the exemplary embodiment shown in FIGS. 4 and 5, the elastic cover 30 has a protruding portion 32 that protrudes downward from a lower surface 31 of the elastic cover 30 and can mate with the mating portion 42 of the holding part 40. The protruding portion 32 includes an annular portion 34, a pair of straight portions 36 extending radially from the annular portion 34, and a cylindrical portion 38 formed integrally with the annular portion 34.

The annular portion 34 extends in a partial circular shape along the circumferential direction between a pair of ends 35. Each end 35 of the annular portion 34 is connected to the cylindrical portion 38. The cylindrical portion 38 protrudes downward from the lower surface 31 of the elastic cover 30 to cover the suction part 22 of the pump body 20.

The pair of straight portions 36 is provided along a direction perpendicular to the direction of protrusion of the suction part 22 of the pump body 20 from the elastic cover 30.

In the exemplary embodiment shown in FIG. 5, the amount of protrusion of each portion of the protruding portion 32 with respect to the lower surface 31 of the elastic cover 30 increases in the order from the pair of straight portions 36 to the annular portion 34 to the cylindrical portion 38.

Figure 10:
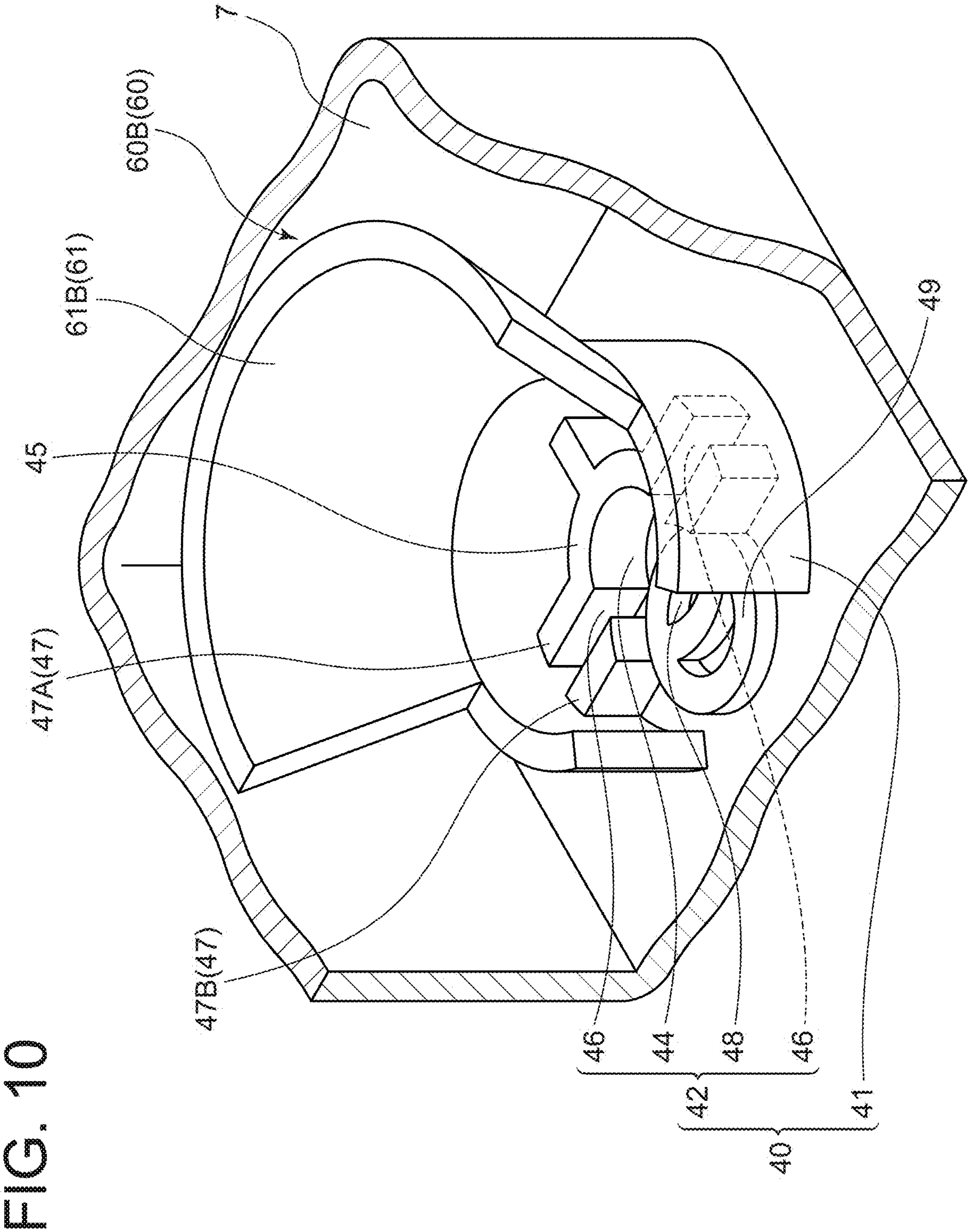
FIG. 10 is a partial cross-sectional perspective view of the lower member of the tank of the vapor separator according to another embodiment.

In some embodiments, as shown in FIGS. 6, 7, and 10, the holding part 40 includes an annular protruding portion 41 protruding from the bottom surface of the lower member 2B of the tank 2, and a mating portion 42 disposed on the inner peripheral side of the annular protruding portion 41. The annular protruding portion 41 is disposed so as to surround the lower portion (elastic cover 30) of the fuel pump 10. The mating portion 42 engages with the protruding portion 32 of the elastic cover 30 on the inner peripheral side of the annular protruding portion 41.

The annular protruding portion 41 is provided only in a part of the circumferential direction, so that the suction part 22 of the fuel pump 10 can protrude radially outward from the elastic cover 30 in the circumferential range where the annular protruding portion 41 is not provided.

In the exemplary embodiment shown in FIGS. 6, 7, and 10, the mating portion 42 includes a first recess 44, a pair of second recesses 46 extending radially from the first recess 44, and a third recess 48 connected to the first recess 44.

The first recess 44 is defined by the inner peripheral surface of an annular wall portion 45 protruding from the bottom surface of the lower member 2B of the tank 2 and the bottom surface of the lower member 2B, and the annular portion 34 of the mating portion 42 of the holding part 40 is fitted into the first recess 44. Each of the second recesses 46 is defined by the side wall surfaces of a pair of straight wall portions 47 protruding from the bottom surface of the lower member 2B and the bottom surface of the lower member 2B, and the straight portion 36 of the mating portion 42 of the holding part 40 is fitted into the second recess 46. Of the total of four straight wall portions 47 (47A, 47B) that define the pair of second recess 46, the first pair of straight wall portions 47A are connected to the corresponding ends of the annular wall portion 45, and the second pair of straight wall portions 47B face each other across the third recess 48. The third recess 48 is defined by the side wall surfaces of the second pair of straight wall portions 47B and the upper surface of a raised portion 49 that protrudes from the bottom surface of the lower member 2B, and the cylindrical portion 38 of the mating portion 42 of the holding part 40 is fitted into it. The raised portion 49 protrudes less from the bottom surface of the lower member 2B of the tank 2 than the other protruding portions (annular wall portion 45 and straight wall portions 47) that form the mating portion 42. The raised portion 49 has a circular contour corresponding to the cylindrical portion 38 in plan view.

In some embodiments, as shown in FIGS. 6 to 8, the guide part 60 includes a plurality of vertical ribs 60A that protrude from the inner wall of the side wall 7 of the lower member 2B of the tank 2. The plurality of vertical ribs 60A are arranged radially around the holding part 40 along the vertical direction.

The amount of protrusion d of each vertical rib 60A from the inner surface of the side wall 7 of the lower member 2B of the tank 2 gradually increases downward. The upper surface of the vertical rib 60A thus functions as a guide surface 61A that is oblique to the vertical direction such that it approaches the holding part 40 as it extends downward.

In the exemplary embodiment shown in FIGS. 6 to 8, when viewed from the out-of-plane direction, each vertical rib 60A has a trapezoidal shape defined by one side corresponding to the guide surface 61A and three sides connected to the outer peripheral surface of the annular protruding portion 41 of the holding part 40, the bottom surface of the lower member 2B, and the side wall 7 of the lower member 2B, respectively.

When the upper member 2A with the upper portion (discharge part 24) of the fuel pump 10 attached is assembled to the lower member 2B, the plurality of vertical ribs 60A guides the lower portion (elastic cover 30) of the fuel pump 10 toward the holding part 40 by the guide surfaces 61A, as shown in FIG. 8.

In other embodiments, as shown in FIGS. 9 and 10, the guide part 60 is a conical guide 60B that extends upward and radially outward from the holding part 40.

In the exemplary embodiment shown in FIGS. 9 and 10, the conical guide 60B is connected to the upper surface of the annular protruding portion 41 of the holding part 40, and the inner diameter of the conical guide 60B gradually expands upward. The upper surface of the conical guide 60B thus functions as a guide surface 61B that is oblique to the vertical direction such that it approaches the holding part 40 as it extends downward.

The conical guide 60B may be provided over the entire circumferential range occupied by the annular protruding portion 41 or, as shown in FIG. 10, only over a part of the circumferential range occupied by the annular protruding portion 41. Further, the conical guide 60B may be discretely provided in multiple areas included in the circumferential range occupied by the annular protruding portion 41.

The vapor separator 1 (1A, 1B) with the above configuration can be assembled by the following procedure.

First, the upper portion (discharge part 24) of the fuel pump 10 is assembled to the upper member 2A of the tank 2. In this context, the upper portion (discharge part 24) of the fuel pump 10 may be assembled to the annular protruding portion 50 of the upper member 2A via the elastic bushing 52.

Then, the upper member 2A of the tank 2 and the fuel pump 10 are lowered toward the lower member 2B while guiding the lower portion (elastic cover 30) of the fuel pump 10 toward the holding part 40 by the guide part 60 (60A, 60B) (see FIGS. 2 and 8). At this time, the upper member 2A and the fuel pump 10 continue to be lowered until the lower portion of the fuel pump 10 mates with the mating portion 42 of the holding part 40. In this way, the upper portion (discharge part 24) of the fuel pump 10 is assembled to the upper member 2A of the tank 2, and the lower portion (elastic cover 30) of the fuel pump 10 is held by the holding part 40 of the lower member 2B.

The vapor separator 1 (1A, 1B) is then obtained by fastening together the upper member 2A and the lower member 2B of the tank 2.

Figure 11:
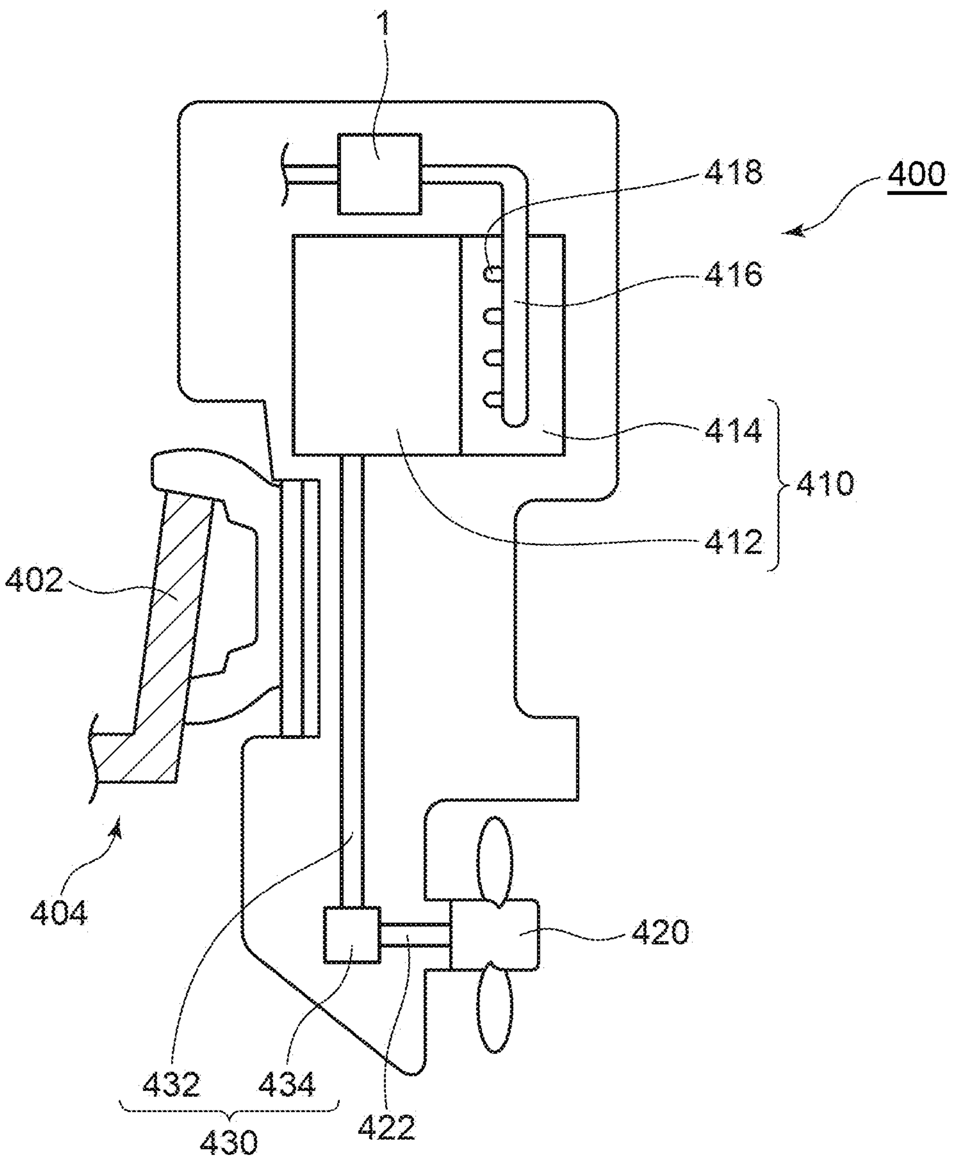
FIG. 11 is a schematic view showing a configuration of an outboard motor according to an embodiment.

With reference to FIG. 11, an outboard motor including the vapor separator 1 (1A, 1B) with the above configuration will be described.

FIG. 11 is a schematic view showing a configuration of an outboard motor according to an embodiment. As shown in this figure, an outboard motor 400 is mounted on a transom 402 of a hull 404. The outboard motor 400 includes the vapor separator 1, an engine 410 for generating power by burning fuel supplied via the vapor separator 1, and a propeller 420 driven by the power from the engine 410.

The engine 410 includes a cylinder block 412 and a cylinder head 414. Fuel passing through the vapor separator 1 reaches a fuel injector 418 through a delivery pipe 416. The fuel injector 418 injects the fuel into each cylinder of the engine 410.

The power generated by the engine 410 is transmitted to a propeller shaft 422 of the propeller 420 via a power transmission member 430. The power transmission member 430 includes a drive shaft 432 connected to the crankshaft (not shown) of the engine 410 and a bevel gear 434 disposed between the propeller shaft 422 and the drive shaft 432.

The characteristic points of the vapor separator and the method for producing the vapor separator according to some embodiments described above are summarized as follows.

[1] A vapor separator (1; 1A, 1B) according to at least some embodiments of the invention is a vapor separator (1; 1A, 1B) installed in a fuel supply system for supplying fuel to an engine, with a tank (2) for storing liquid fuel and a fuel pump (10) disposed in the tank (2). The tank (2) includes: an upper member (2A) assembled with an upper portion of the fuel pump (10); and a lower member (2B) located below the upper member (2A), connected to the upper member (2A), and having a holding part (40) for holding a lower portion of the fuel pump (10). The lower member (2B) of the tank (2) includes a guide part (60; 60A, 60B) located between a side wall (7) of the lower member (2B) and the holding part (40) in plan view, the guide part serving to guide the lower portion of the fuel pump (10) toward the holding part (40) when the upper member (2A) with the upper portion of the fuel pump (10) attached is assembled to the lower member (2B).

With the above configuration [1], since the guide part (60; 60A, 60B) is provided to guide the lower portion of the fuel pump (10) toward the holding part (40) when the upper member (2A) of the tank (2) with the upper portion of the fuel pump (10) attached is assembled to the lower member (2B), the fuel pump (10) can be easily installed.

Additionally, since the bracket (pump fixing part) to immovably secure the fuel pump (10) to the upper member (2A) of the tank (2) is not required, it is possible to suppress cost increases due to an increase in the number of parts.

[2] In some embodiments, in the above configuration [1], the guide part (60; 60A, 60B) is disposed at the lower member (2B) at least partially between the side wall (7) of the lower member (2B) and the holding part (40) and higher than the holding part (40).

With the above configuration [2], since the guide part (60; 60A, 60B) is at least partially located higher than the holding part (40), when the fuel pump (10) is lowered to the lower member (2B) with the fuel pump (10) suspended from the upper member (2A) of the tank (2), the guide part (60) is likely to come into contact with the fuel pump (10) before the holding part (40). This allows the guiding function of the guide part (60; 60A, 60B) for the fuel pump (10) to be effectively utilized.

[3] In some embodiments, in the above configuration [1] or [2], the guide part (60) includes a plurality of vertical ribs (60A) arranged radially around the holding part (40) along the vertical direction so as to protrude from the inner wall of the side wall (7) of the lower member (2B) of the tank (2). The amount of protrusion of each of the vertical ribs (60A) from the inner surface of the side wall (7) of the lower member (2B) of the tank (2) increases downward.

With the above configuration [3], by using vertical ribs (60A) protruding from the inner wall of the side wall (7) of the lower member (2B) of the tank (2), the function of the guide part (60) can be achieved at a low cost while reducing the number of parts.

Additionally, since the vertical ribs (60A) protruding from the inner wall of the side wall (7) of the lower member (2B) of the tank (2) are arranged radially around the holding part (40), the fuel pump (10) can be guided toward the holding part (40) from multiple directions. Furthermore, since the amount of protrusion (d) of each vertical rib (60A) from the inner surface of the side wall (7) of the lower member (2B) of the tank (2) increases downward, the fuel pump (10) can be effectively guided toward the holding part (40) along the upper surface (61A) of the vertical rib (60A) which is oblique to the vertical direction.

[4] In some embodiments, in the above configuration [1] or [2], the guide part (60) is a conical guide (60B) that extends upward and radially outward from the holding part (40).

With the above configuration [4], in the circumferential range where the conical guide (60B) is installed, the fuel pump (10) can be effectively guided toward the holding part (40) along the upper surface (61B) of the conical guide (60B), which is oblique to the vertical direction.

[5] In some embodiments, in any of the above configurations [1] to [4], the fuel pump (10) includes: a pump body (20); and an elastic cover (30) covering a lower portion of the pump body (20). The holding part (40) includes: an annular protruding portion (41) that protrudes from a bottom surface of the lower member (2B) so as to surround the lower portion of the fuel pump (10); and a mating portion (42) capable of mating with the elastic cover (30) on the inner peripheral side of the annular protruding portion (41).

In the above configuration [5], when the upper member (2A) of the tank (2) with the upper portion of the fuel pump (10) attached is assembled to the lower member (2B), the elastic cover (30) covering the lower portion of the pump body (20) of the fuel pump (10) and the mating portion (42) on the inner peripheral side of the annular protruding portion (41) of the holding part (40) need to be fitted together.

In this regard, as described in [1], the guide part (60; 60A, 60B) located between the side wall (7) of the lower member (2B) and the holding part (40) in plan view guides the lower portion of the fuel pump (10) toward the holding part (40), so that the elastic cover (30) of the fuel pump (10) can easily mate with the mating portion (42) of the holding part (40).

[6] In some embodiments, in any of the above configurations [1] to [5], the vapor separator (1; 1A, 1B) has an elastic bushing (52) disposed between the upper portion of the fuel pump (10) and the upper member (2A).

If the upper portion of the fuel pump (10) is assembled to the upper member (2A) of the tank (2) via the elastic bushing (52) as described in [6], the fuel pump (10) is more likely to pivot on the elastic bushing (52) as a fulcrum. Therefore, it is necessary to stabilize the position of the fuel pump (10) when assembling the upper member (2A) of the tank (2) and the fuel pump (10) to the lower member (2B) of the tank (2).

In this regard, as described in [1], when the upper member (2A) of the tank (2) with the upper portion of the fuel pump (10) attached is assembled to the lower member (2B), the guide part (60; 60A, 60B) guides the lower portion of the fuel pump (10) toward the holding part (40). Thus, the fuel pump (10) can be easily installed while suppressing cost increases due to an increase in the number of parts.

[7] A method for producing a vapor separator according to some embodiments is a method for producing the vapor separator (1; 1A, 1B) with any of the above configurations [1] to [6], including: a step of assembling the upper portion of the fuel pump (10) to the upper member (2A) of the tank (2); a step of lowering the upper member (2A) and the fuel pump (10) toward the lower member (2B) while guiding the lower portion of the fuel pump (10) toward the holding part (40) by the guide part (60; 60A, 60B); and a step of fastening together the upper member (2A) and the lower member (2B) of the tank (2A) while the lower portion of the fuel pump (10) is held by the holding part (40).

With the above method [7], as described in [1], when the upper member (2A) of the tank (2) with the upper portion of the fuel pump (10) attached is assembled to the lower member (2B), the guide part (60) located between the side wall (7) of the lower member (2B) and the holding part (40) in plan view guides the lower portion of the fuel pump (10) toward the holding part (40), so that the fuel pump (10) can be easily installed.

Additionally, since the bracket (pump fixing part) to immovably secure the fuel pump (10) to the upper member (2A) of the tank (2) is not required, it is possible to suppress cost increases due to an increase in the number of parts.

[8] An outboard motor (400) according to some embodiments is provided with: the vapor separator (1; 1A, 1B) with any of the above configurations [1] to [6]; an engine (410) for generating power by burning fuel supplied via the vapor separator (1; 1A, 1B); and a propeller (420) driven by the power from the engine (410).

With the above configuration [8], as described in [1], when the upper member (2A) of the tank (2) with the upper portion of the fuel pump (10) attached is assembled to the lower member (2B), the guide part (60) located between the side wall (7) of the lower member (2B) and the holding part (40) in plan view guides the lower portion of the fuel pump (10) toward the holding part (40), so that the fuel pump (10) can be easily installed.

Additionally, since the bracket (pump fixing part) to immovably secure the fuel pump (10) to the upper member (2A) of the tank (2) is not required, it is possible to suppress cost increases due to an increase in the number of parts.

The invention claimed is:

1. A vapor separator installed in a fuel supply system for supplying fuel to an engine, comprising:

a tank for storing liquid fuel; and a fuel pump disposed in the tank, the tank including:

an upper member assembled to an upper portion of the fuel pump; and a lower member located below the upper member, connected to the upper member, and having a holding part for holding a lower portion of the fuel pump, the lower member of the tank including a guide part located between a side wall of the lower member and the holding part in plan view, the guide part serving to guide the lower portion of the fuel pump toward the holding part when the upper member with the upper portion of the fuel pump attached is assembled to the lower member, wherein the tank formed by the upper member and the lower member defines an internal space for storing the liquid fuel, and the fuel pump is disposed in the internal space of the tank.

2. The vapor separator according to claim 1, wherein the guide part is disposed at the lower member at least partially between the side wall of the lower member and the holding part and higher than the holding part.

3. The vapor separator according to claim 1, wherein the guide part includes a plurality of vertical ribs arranged radially around the holding part along a vertical direction so as to protrude from an inner wall of the side wall of the lower member of the tank, and an amount of protrusion of each of the vertical ribs from an inner surface of the side wall of the lower member of the tank increases downward.

4. The vapor separator according to claim 1, wherein the guide part is a conical guide that extends upward and radially outward from the holding part.

5. The vapor separator according to claim 1, wherein the fuel pump includes:

a pump body; and an elastic cover covering a lower portion of the pump body, and the holding part includes:

an annular protruding portion that protrudes from a bottom surface of the lower member so as to surround the lower portion of the fuel pump; and a mating portion capable of mating with the elastic cover on an inner peripheral side of the annular protruding portion.

6. The vapor separator according to claim 1, comprising an elastic bushing disposed between the upper portion of the fuel pump and the upper member.

7. A method for producing the vapor separator according to claim 1, comprising:

a step of assembling the upper portion of the fuel pump to the upper member of the tank;

a step of lowering the upper member and the fuel pump toward the lower member while guiding the lower portion of the fuel pump toward the holding part by the guide part; and a step of fastening together the upper member and the lower member of the tank while the lower portion of the fuel pump is held by the holding part.

8. An outboard motor, comprising:

the vapor separator according to claim 1;

an engine for generating power by burning fuel supplied via the vapor separator; and a propeller driven by the power from the engine.

9. The vapor separator according to claim 1, wherein the fuel pump includes a pump body having a pumping element for boosting the liquid fuel and a suction part for directing the liquid fuel stored in the internal space of the tank to the pumping element.

10. The vapor separator according to claim 9, wherein the suction part extends from the pump body toward a side opposite to the guide part.

11. The vapor separator according to claim 1, wherein at least a portion of the lower portion of the fuel pump and the holding part are immersed in the liquid fuel stored in the tank.

12. The vapor separator according to claim 1, wherein a liquid surface of the liquid fuel stored in the tank is located above a joint surface between the upper member and the lower member.

* * * * *